United States Patent
Markert

(10) Patent No.: US 7,019,483 B2
(45) Date of Patent: Mar. 28, 2006

(54) DEVICES FOR POSITION-CONTROLLED STOPPING OF ROTATING COMPONENTS WITH POSITION-CONTROLLED DRIVE MECHANISMS IN THE CASE OF VOLTAGE LOSS

(75) Inventor: Nikolaus Markert, Triefenstein (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 126 days.

(21) Appl. No.: 10/240,762

(22) PCT Filed: Apr. 6, 2001

(86) PCT No.: PCT/DE01/01345

§ 371 (c)(1),
(2), (4) Date: Oct. 15, 2002

(87) PCT Pub. No.: WO01/80417

PCT Pub. Date: Oct. 25, 2001

(65) Prior Publication Data

US 2003/0146728 A1 Aug. 7, 2003

(30) Foreign Application Priority Data

Apr. 15, 2000 (DE) .............................. 100 18 774

(51) Int. Cl.
  *G05B 11/01* (2006.01)
  *H02J 7/34* (2006.01)
  *H02J 9/06* (2006.01)
  *H02J 11/00* (2006.01)

(52) U.S. Cl. ..................... 318/671; 318/86; 318/366; 318/63; 307/67

(58) Field of Classification Search ................ 318/671, 318/673, 86, 139, 758, 759, 366, 63, 273, 318/370–372; 307/66, 67, 68, 46, 48
See application file for complete search history.

(56) References Cited

U.S. PATENT DOCUMENTS

| 4,528,459 | A | * | 7/1985 | Wiegel ......................... 307/66 |
| 4,617,497 | A | * | 10/1986 | Wolf ........................... 318/78 |
| 4,642,475 | A | * | 2/1987 | Fischer et al. ................ 307/66 |
| 4,661,756 | A | * | 4/1987 | Murphy et al. ............. 318/701 |
| 4,843,292 | A | * | 6/1989 | Ono et al. ................... 318/606 |
| 4,914,371 | A | * | 4/1990 | Shibata et al. .............. 318/723 |
| 4,988,273 | A | * | 1/1991 | Faig et al. ................... 318/138 |
| 5,038,090 | A | * | 8/1991 | Kawabata et al. .......... 318/721 |
| 5,113,123 | A |   | 5/1992 | Noser et al. ................ 318/106 |
| 5,814,956 | A | * | 9/1998 | Kono et al. ................. 318/380 |
| 5,844,328 | A | * | 12/1998 | Furst ........................... 307/66 |

FOREIGN PATENT DOCUMENTS

DE          3347113 A1      7/1985

(Continued)

OTHER PUBLICATIONS

"Machine Drive", 2244 Research Disclosure (1989) Jan., No. 297, Emsworth, GB.

*Primary Examiner*—Edgardo San Martin
(74) *Attorney, Agent, or Firm*—Jones, Tullar & Cooper, PC

(57) ABSTRACT

The position-controlled stopping of rotating components of shaftless drive mechanisms, in the case of a loss of voltage, is accomplished by the provision of an external connectable network. That external connectable network supplies the process power which is missing due to a loss of rotational power in the event of a voltage loss.

10 Claims, 2 Drawing Sheets

FOREIGN PATENT DOCUMENTS

| | | |
|---|---|---|
| DE | 3412060 A1 | 10/1985 |
| DE | 39 10 183 A1 | 10/1990 |
| DE | 40 11 598 A1 | 10/1991 |
| DE | 195 09 947 A1 | 9/1996 |
| DE | 195 29 430 A1 | 1/1997 |
| DE | 196 00 110 A1 | 7/1997 |
| DE | 297 14 319 U1 | 1/1998 |
| EP | 0 757 306 A1 | 2/1997 |

* cited by examiner

DEVICES FOR POSITION-CONTROLLED STOPPING OF ROTATING COMPONENTS WITH POSITION-CONTROLLED DRIVE MECHANISMS IN THE CASE OF VOLTAGE LOSS

The present invention is directed to a device for position-controlled stopping of rotating components with position-controlled drive mechanisms in the case of a voltage loss. The rotating component is supplied with a necessary differential energy from an external network.

BACKGROUND OF THE INVENTION

In the case of a voltage loss, the drive mechanisms of a production train, such as the drive mechanisms of a web-fed rotary printing press, are shut down in a controlled angularly synchronous manner in order to thus prevent a rupture or a breakage of the web. Units with excess kinetic energy, such as, for example, rotating centrifugal masses, are brought to a stop within the normal rapid stop sequence through controlled reduction of the kinetic energy, for example, by the use of braking resistances, such as so-called bleeders.

Those units such as, for example, folding apparatuses, which cannot themselves supply enough rotational energy in relation to the required process energy during the normal rapid stopping time, are continuously operated by the provision of external, uninterruptible power supplies, so-called UPS's, in order to be able to exert the required process energy in case of a voltage loss.

"MACHINE DRIVE" RESEARCH DISCLOSURE, KENNETH MASON PUBLICATIONS, HAMPSHIRE, GB, No. 297, 1989, pp. 23 to 24 describes a device for the position-controlled stopping of rotating components in the case of a voltage loss. The energy required for this position-controlled stoppage is supplied by a battery.

However, this publication discloses neither which part of the regulator the battery is connected to nor what type of motor is used.

SUMMARY OF THE INVENTION

The object of the present invention is to produce a device for the position-controlled stopping of rotating components with position-controlled drive mechanisms in the case of a voltage loss.

This object is attained in accordance with the present invention by supplying the rotating components with a necessary differential energy. An external network is provided to supply this differential energy and it includes a battery. The battery can be connected to an intermediate DC element of a drive converter. The drive mechanisms which are used to drive the rotating components are three phase motors.

The advantages that can be achieved with the present invention are comprised particularly in that those units with an insufficient inherent kinetic energy for accomplishing their own controlled stopping are supplied only with the differential energy quantity required for the stopping process. The supplied differential energy quantity is the difference between the existing rotation energy quantity and the process energy quantity required for the respective drive mechanism to properly stop the particular unit.

In a second preferred embodiment of the present invention, some components of a conventional UPS can also be eliminated in that only the energy storage device of the UPS is used.

BRIEF DESCRIPTION OF THE DRAWINGS

The present invention will be explained in detail below in conjunction with two preferred embodiments and as depicted in the accompanying drawings, in which.

DESCRIPTION OF THE PREFERRED EMBODIMENT

Figure 1:
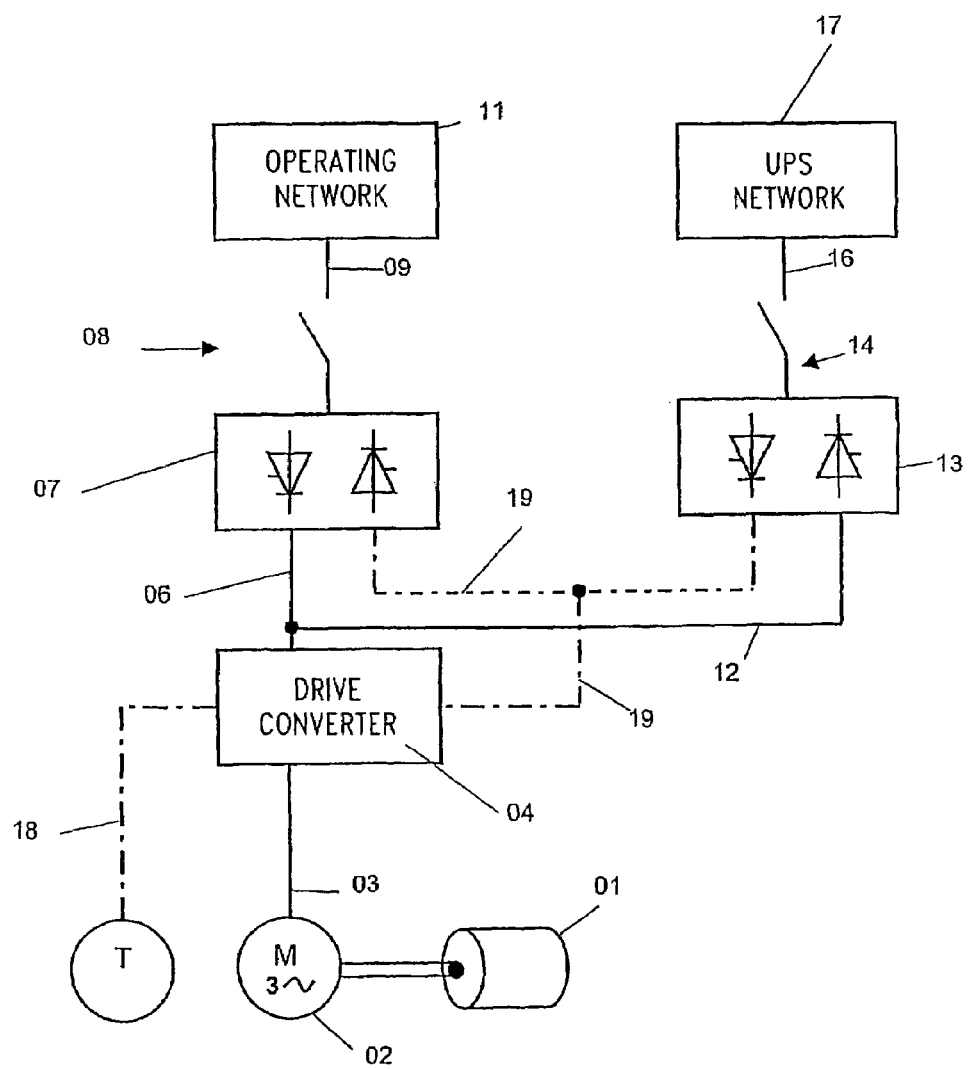
FIG. 1 shows a schematic circuit diagram of a circuit arrangement in accordance with the present invention in a first preferred embodiment.

Referring initially to FIG. 1, a rotating component 01, such as, for example, a folding apparatus of a web-fed rotary printing press, is driven in a speed-controlled and position-controlled manner by the use of a shaftless drive mechanism 02, such as an electric motor. The electric motor 02, which is preferably a three-phase motor, receives its energy supply via a line 03 from a generally conventional drive converter 04, which is connected, via a line 06, an electronic switch 07, a network-disconnecting switch 08, and a line 09 to an operating network 11, of, for example, 400 Volt three-phase current.

The drive converter 04 can be comprised at least of sub-units, which are not specifically shown, such as a rectifier, an intermediate DC circuit, a DC-AC converter, and a control element. In addition, the drive converter 04 can contain a dropping resistor or bleeder in order to convert excess braking energy into heat if necessary.

For the eventuality of a voltage loss of the operating network 11, the drive converter 04 is connected, via a line 12, to an electronic switch 13, which is parallel to the switch 07 and which switch 13 is connected, via a network-disconnecting switch 14 and a line 16, to an external network 17 with, for example, an external uninterruptible power supply 17, a so-called UPS or uninterruptible power supply network 17, of, for example, 400 Volt AC current.

Between the drive converter 04 and the two electronic switches 07 and 13, control lines 19 are provided, which control lines 19 are depicted with dashed lines in FIG. 1. A tachometer generator T, which is coupled to the electric motor 02, is likewise connected, via a control line 18, to the drive converter 04. The drive converter 04 contains a control element, which is not specifically shown.

In the case of a voltage loss of the operating network 11 depicted in FIG. 1, the electronic switches 07; 13 switch over from the operating network 11 to the external power supply 17 in an uninterrupted fashion. As a result, the electric motor 02 is supplied, through the drive converter 04 and the line 03, with enough differential energy $E_D$, such as, for example with, 15 kWs, for the rotating component 01 to receive a total process energy $E_P$, such as, for example, 50 kWs, which total process energy is required for a correctly-positioned stopping of the rotating component. The total process energy is arrived at when the differential energy is added to the, for example, 35 kWs supplied from the rotation energy $E_R$ of the folding apparatus 01.

Figure 2:
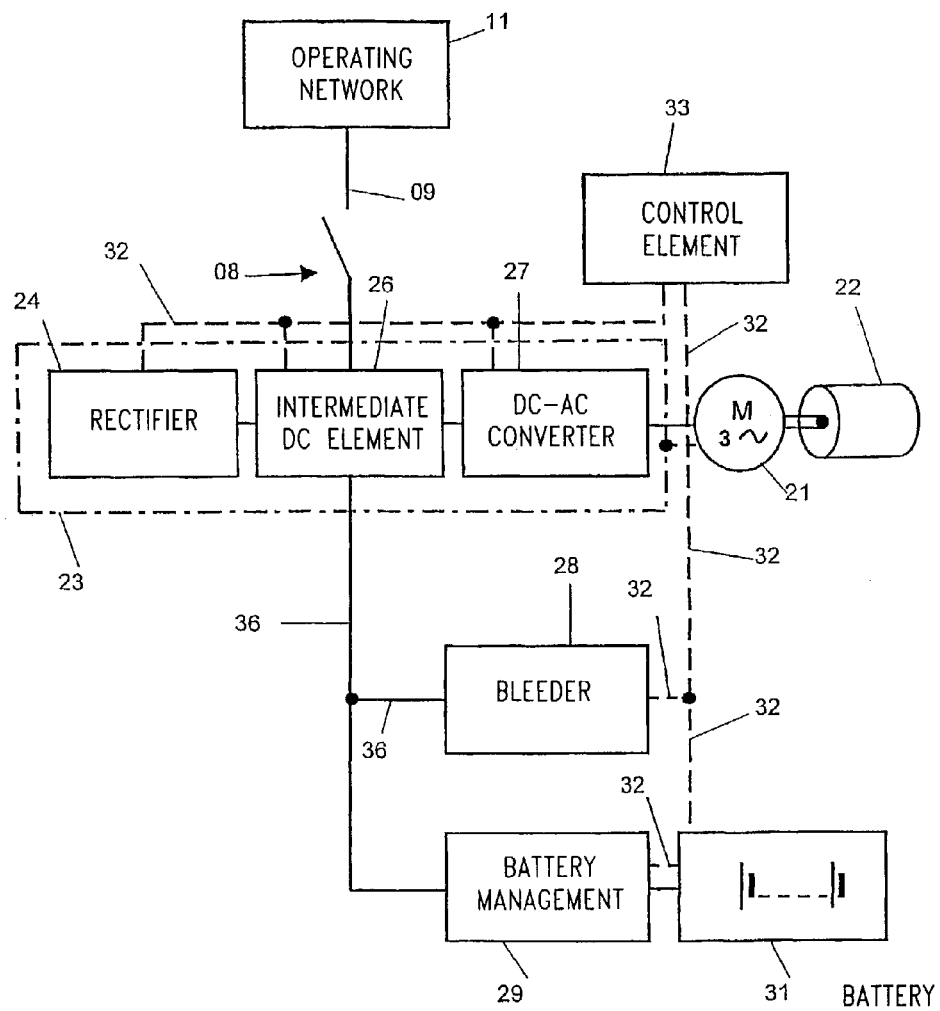
FIG. 2 shows a schematic circuit diagram of a circuit arrangement in accordance with the present invention in a second preferred embodiment.

In accordance with a second preferred embodiment of the present invention, as depicted in FIG. 2, the correctly-positioned stopping of the rotating component 22, such as, for example, a folding apparatus, driven in a shaftless manner by an electric motor 21, is carried out by the use of an uninterruptible power supply 29, 31, which is connected directly to a drive converter 23.

The drive converter 23 is essentially comprised of a rectifier 24, an intermediate DC element 26, and a DC-AC converter 27. The drive converter 23 is also associated with a generally conventional bleeder 28, which is configured as a braking resistance, and a battery 31, of, for example, 400 Volt, with an associated battery management 29.

All of the sub-units 21, 26 to 28, 29, 31 are connected to a control element 33 by a control line 32.

A separate power supply, as was depicted as the UPS network 17 in the first preferred embodiment shown in FIG. 1, can be omitted in this second preferred embodiment since the input and output elements 24; 27, the rectifier 24 and the DC-AC converter 27, which are respectively provided in the power supply 17 and in the drive converter 23, can be used together.

Only the battery management 29, and the battery 31, with, for example, 15 kWs, temporarily take over for the former external uninterruptible power supply, i.e. are associated with the intermediate DC element 26 of the drive converter 23.

In the case of a failure of the operating network 11 depicted in FIG. 2, the battery management 29 switches over to battery operation. The differential energy $E_D$, of, for example, 15 kWs, which is thus obtained from the power supply 29, 31, together with the rotation energy $E_R$, of, for example, 35 kWs, of the folding apparatus 22, is sufficient to supply the required process energy $E_P$, of, for example, 50 kWs that is needed to accomplish the correctly-positioned stopping of the rotating component 22.

The intermediate DC element 26 is connected by lines 36 to the bleeder 28, as well as to the power supply 29, 31.

While preferred embodiments of devices for the position-controlled stopping of rotating components with position-controlled drive mechanisms in the case of voltage loss in accordance with the present invention have been set forth fully and completely hereinabove, it will be apparent to one of skill in the art that various changes in, for example, the specific rotating component used, the type of web-fed rotary printing press, and the like, could be made without departing from the true spirit and scope of the present invention which is accordingly to be limited only by the appended claims.

What is claimed is:

1. A device for the position-controlled stopping of rotating components in response to a voltage loss to the rotating components comprising:
    a rotating component, said rotating component having an existing rotation energy and requiring a known process energy for a correctly-positioned stopping of said rotating component;
    a speed controlled and position-controlled drive mechanism for said rotating component, said speed controlled and position-controlled drive mechanism being a three phase motor;
    a drive converter having an intermediate DC element, said drive converter connecting with said speed controlled and position-controlled drive mechanism in response to a voltage loss; and
    an external network for supplying said rotating component with a differential energy, said differential energy being a difference between said existing rotation energy and said known process energy, said external network including a battery, said battery being connected to said intermediate DC device.

2. The device of claim 1 further wherein a capacitance of said external network is based on said differential energy.

3. The device of claim 1 including an operating network for said rotating component and an uninterruptible energy source for said rotating component and further including at least one switch between said operating network and said uninterruptible energy source.

4. The device of claim 1 wherein said rotating component is selectively connectable to a braking resistance when said existing rotation energy is excessive, as compared to said known process energy.

5. The device of claim 1 wherein said rotating component is disposed in a folding apparatus of a web-fed rotary printing press.

6. A web fed rotary printing press control system for use during power supply problems or interruptions, comprising:
    a folding apparatus incorporated in a web fed rotary printing press, said folding apparatus including a rotating component controlled to rotate at a rate corresponding to a known process energy, wherein said known process energy is pre-defined for a correctly-positioned stopping of said folding apparatus rotating component;
    a mains power supply sensing system configured to sense whether a mains power supply voltage level has dropped below a selected level; and
    an uninterruptible power supply control system responsive to said mains power supply sensing system, said uninterruptible power supply control system being configured to sense said voltage drop and, in response, supply said rotating component with a differential energy, said differential energy being a difference between said rotating component's existing rotation energy and said known process energy.

7. The web fed rotary printing press control system of claim 6, wherein said uninterruptible power supply control system controls an external network including a battery, said battery being connected to an intermediate DC device.

8. The web fed rotary printing press control system of claim 6, wherein a capacitance of said external network is based on said differential energy.

9. The web fed rotary printing press control system of claim 6, including an operating network for said rotating component and an uninterruptible energy source for said rotating component and further including at least one switch between said operating network and said uninterruptible energy source.

10. The web fed rotary printing press control system of claim 6, wherein said rotating component is selectively connectable to a braking resistance when said existing rotation energy is excessive, as compared to said known process energy.

* * * * *